United States Patent Office 3,541,016
Patented Nov. 17, 1970

3,541,016
PROCESS FOR THE PRODUCTION OF FERRITE MIXTURES OF IMPROVED QUALITY
Balázs Pataky, Dezsö Horváth, and György Szakács, Budapest, and Tibor Horvárh, Veszprem, Hungary, assignors to Licencia Talalmanyokat Ertekesito Vallalat, Budapest, Hungary
No Drawing. Filed Dec. 19, 1967, Ser. No. 691,700
Claims priority, application Hungary, Dec. 29, 1966, Va 1,210
Int. Cl. C04b 35/30, 35/38
U.S. Cl. 252—62.56         3 Claims

ABSTRACT OF THE DISCLOSURE

Ferrite mixtures from metal powders of iron and at least one of manganese and nickel are produced by subjecting the metal powders to an oxygen stream at temperatures above their melting point until the liquid ferrite phase develops and solidifies and by then grinding the solidified ferrite and thereafter adding at least one relatively volatile metal oxide such as zinc oxide, molding the mixture, and then sintering the molded mixture. This invention relates to a process for the production of ferrite mixtures of improved quality.

---

In the production of ferrites, in general, the so-called dry oxide technique is employed. By this method, the oxides or carbonates of bivalent metals (e.g., of $Fe_2O_3$, NiO, ZnO, MgO, $MnCO_3$) are mixed up with each other in an adequate ratio, and the mixtures are preignited. The purpose of preignition is partly the decomposition of the employed carbonates to oxides and partly the induction of ferrite formation. The preignited and partly ferritized mixture is ground, mixed with lubricating and binding substances, pressed to forms and finished by sintering. The known oxide technique has the drawback that the initial substances contain appreciable amounts of contaminations, mainly $SiO_2$, CaO and alkalis which have detrimental effects on the magnetic properties of the formed ferrites. The preparation of oxides of high purity, containing contaminants not exceeding 0.01 to 0.001 percent is technically very cumbersome and expensive. In order to produce ferrites of high permeability and low loss, the mentioned contaminants of detrimental effect must be reduced to a minimum level. In the conventional oxide technique, also the repeated ignition represents a major drawback in that the required furnace capacity is doubled. Various methods had been suggested for the elimination of these disadvantages.

According to known processes instead of oxides, pulverized metals are applied as initial substances. Namely, pulverized metals contain significantly less contaminants than oxides. Moreover, the production of pulverized metals of high purity requires, in general, lower costs. The mixture of pulverized metals is ignited in air at a temperature between 500 and 1000° C., and the mixture is subsequently oxidized in solid phase. Owing to the reducing effect of pulverized metals, zinc oxide is added to the mixture only after the oxidizing preignition because zinc as a metal evaporates at 907° C. Ferrite formation with the previously oxidized other components takes place thereafter during the finishing sintering operation. This known method carries however the drawback that, on one hand, a preignition by a separate heat-treatment is necessary, and, on the other hand, no ferrite formation takes place at the relatively low temperature employed during the preignition phase. In the course of the preignition, the applied manganese is converted into forms of different valence, depending on the employed temperature. Thus, in the temperature range from 500 to 1000° C., manganese is present in trivalent and quadrivalent forms, respectively, and consequently, it does not participate in ferrite formation at all, because only bivalent manganese can be incorporated in the ferrite lattice. Though manganese oxides of higher valence are actually reduced at the temperature of the finishing sintering operation, they form pores in the structural texture of ferrite, and thus they deteriorate the magnetic properties of the end product. According to this method Mn-Zn ferrites of an initial permeability of only 1300 could be produced.

According to another method, the initial mixture of pulverized metals is converted in an oxygen stream into oxides at the melting point of the mixture, without the application of any external heating. The components of lower melting point which burn easier, e.g., zinc oxide are added to the melt in a multiple excess because zinc oxide evaporates at 1800° C. Owing to the disappearance of zinc oxide, melting is carried out at a relatively low temperature where ferrite formation is incomplete. In order to maintain the continuity of the oxidizing process, the melt is chilled in an oxygen current. This known method has the drawback that a great excess of the low melting point components which burn readily is required. By this, the expenses of starting substances essentially increase and besides, the composition of ferrite mixtures produced in this way cannot be controlled. For the production of ferrites of reproductible quality and of an adequate magnetic property, the accurate adjusting of the composition is indispensable.

The main feature of the present invention is the elimination of the drawbacks of the known method of ferrite production, and the development of a method for the production of easily reproductible ferrites of improved quality with the aid of an economical process.

The invention was developed on the basis of experience that zinc ferrite is formed at a temperature essentially lower, i.e., zinc oxide may be incorporated in the spinel lattice essentially at a higher rate than other components of higher melting point (e.g., $Fe_2O_3$, MnO, NiO). By X-ray diffraction it was surprisingly found, that the formation of zinc ferrite begins already at 600° C. and is fully completed at 1000° C. The formation of manganese ferrite, in turn, starts only at temperatures over 1000° C., due to the presence of transitionary manganese ions of higher valence. Consequently, manganese ions are incorporated only later in the already formed zinc ferrite lattice, during the ignition of the ferrite mixture.

According to the invention, ferrite mixtures of improved quality are prepared from pulverized metals and zinc oxide, in a way that in the first step, the pulverized metals, mainly pulverized iron and manganese and nickel, respectively, are heated in the absence of zinc oxide at a temperature over their melting points, under introduction of an oxygen stream, until a liquid ferrite phase forms. Subsequently, the cooled ferrite ingot is pulverized. The initial metal powders are applied preferably as substances of a grain size below 0.1 millimetre. In the second step, zinc oxide is added to the pulverized ferrite, in an amount corresponding to the desired composition. The obtained mixture is pressed to forms, and finished by sintering. In the first step, the mixture of pulverized iron and manganese is heated advantageously at a temperature between 1600 and 1800° C., in an oxygen stream. The ferrites produced by the invented process show improved magnetic properties, thus, e.g., a Mn-Zn ferrite of the same composition as that mentioned above had an initial permeability of 3000.

The process of the invention represents an appreciable technical advance over the known conventional production of ferrites since on using a simple technique it is possible to improve the quality of ferrite end-products.

The advantages offered by the invention over the state of art can be summarized as follows.

(1) By this method, pulverized ferrite of essentially higher purity, free of contaminants can be produced. Ferrite powder of an identical purity cannot be obtained with the use of oxides or other compounds applied in the production of ferrites even when refining is carried out in numerous chemical steps.

(2) The process is very economic because no loss occurs on burning, and the pulverized metals serving as starting substances are essentially cheaper than the conventionally applied metal oxides.

(3) The technique of ferrite production can be simplified to a significant extent in that the preignition step can be eliminated. In this way, the furnace capacity of the equipments for the production of ferrite can be doubled.

(4) In the production of ferrite mixtures, an additional advantage is offered by the fact that at temperatures over 1400° C., manganese is present as a stable bivalent ion. Consequently, the ferrite lattice developed under these conditions will be completely free of inclusions. By this, the magnetic properties of the end product are improved.

(5) A further advantage of the process is the possibility of producing products of reproducible, identical composition and magnetic properties.

On carrying out the process, the pulverized metals of a grain size below 0.1 millimetre employed as starting substances are mixed up with each other in the desired ratio. The mixture of powders is oxidized in a metal chill form which can be cooled with water, under continuous dosage, by blowing in oxygen gas of a pressure of 2 to 3 atmospheres. When ferrite formation is completed, the bath automatically solidifies. The obtained ferrite ingot is disintegrated in a jaw-crusher then in a hammer mill to a grain size below 0.1–0.5 millimetre. To the disintegrated ingot, an adequate amount of zinc oxide of a specific surface of 4 to 40 sq. m. per gram is added under stirring. Subsequently, the mixture is wet-ground in a ball mill or attritor for 3 to 20 hours. The addition of a lubricant, the moulding and the finishing by sintering may be carried out by the conventional methods of oxide technique.

According to the invention it is possible to produce manganese-zinc-ferrite of high permeability for the purposes of transmission technique, nickel-zinc-ferrite for radio-technical purposes, manganese-magnesium-zinc-ferrite of a quadrangular hysteresis curve and other special ferrite types.

Further details of the process are described in the following example.

A mixture of 13.56 kg. of pulverized iron and 3.30 kg. of pulverized electrolytic manganese served as starting substance.

Ferritization was carried out in a 50 kg. steel chill form, without any external heat application, with the use of 11 cubic metres of oxygen. The homogeneous ingot was disintegrated and ground in an attritor mill for 6 to 8 hours. At the beginning of grinding, 0.1655 kg. of zinc oxide was added to the mixture, per kilogram of the ingot. The ground mass was moulded to forms. Finishing by sintering was carried out at 1300° C., for a 5-hour period. The ferrite products of a content of 53 mole percent of $Fe_2O_3$, 26 mole percent of $MnO$ and 21 mole percent of $ZnO$ showed the following magnetic properties.

Initial permeability $(\mu_0) = 3000$
Saturation $(B_s) = 4500$ gauss
Hysteresis factor measured at 20 kHz. $(h/\mu_0^2) \cdot 10^3 = 1.2$
Loss factor measured at 100 kHz $(tg/\mu_0^2) \cdot 10^6 = 9$
Curie temperature $= 160°$ C.

We claim:

1. A process for the production of ferrite mixtures from metal powders of iron and at least one of manganese and nickel and from at least one metal oxide of high volatility by heat treatment in an oxygen stream without employing external heating, comprising keeping the mixture of said metal powders in an oxygen stream at temperatures above their melting point until the liquid ferrite phase develops, solidifying the ferrite phase to an ingot, grinding the solidified ferrite ingot, subsequently adding said at least one metal oxide having a lower melting point than said metal powders in a desired ratio, molding this mixture, and sintering the molded mixture.

2. A process according to claim 1 which comprises ferritizing the mixture of metal powder in an oxygen stream without external heating by melting at 1600° to 1800° C.

3. A process according to claim 1 which comprises employing said at least one metal oxide in a form having a specific surface of 4 to 40 square meters per gram.

References Cited

UNITED STATES PATENTS 3,000,828    9/1961    Buckley et al. _____ 252—62.56

FOREIGN PATENTS 712,453    7/1954    Great Britain.
881,648    11/1961    Great Britain.

TOBIAS E. LEVOW, Primary Examiner

R. D. EDMONDS Assistant Examiner

U.S. Cl. X.R.

252—62.62, 62.64